US008839049B2

(12) United States Patent
Hiltunen et al.

(10) Patent No.: US 8,839,049 B2
(45) Date of Patent: *Sep. 16, 2014

(54) DYNAMICALLY ALLOCATING MULTITIER APPLICATIONS BASED UPON APPLICATION REQUIREMENTS AND PERFORMANCE RELIABILITY OF RESOURCES

(71) Applicant: AT&T Intellectual Property I, L.P., Atlanta, GA (US)

(72) Inventors: Matti Hiltunen, Morristown, NJ (US); Kaustubh R. Joshi, Scotch Plains, NJ (US); Gueyoung Jung, Rochester, NY (US); Calton Pu, Atlanta, GA (US); Richard Dale Schlichting, New Providence, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/941,752

(22) Filed: Jul. 15, 2013

(65) Prior Publication Data

US 2013/0298135 A1    Nov. 7, 2013

Related U.S. Application Data

(63) Continuation of application No. 12/911,201, filed on Oct. 25, 2010, now Pat. No. 8,489,939.

(51) Int. Cl.
| | |
|---|---|
| *G06F 11/00* | (2006.01) |
| *G06F 9/50* | (2006.01) |
| *G06F 11/14* | (2006.01) |
| *G06F 11/34* | (2006.01) |

(52) U.S. Cl.
CPC ................ *G06F 9/50* (2013.01); *G06F 11/008* (2013.01); *G06F 11/1482* (2013.01); *G06F 11/3495* (2013.01)

USPC ........................................................... 714/48

(58) Field of Classification Search
USPC ...................................................... 714/1–57
See application file for complete search history.

(56) References Cited

U.S. PATENT DOCUMENTS

| | | | | | |
|---|---|---|---|---|---|
| 5,463,775 | A | * | 10/1995 | DeWitt et al. | .................. 702/186 |
| 6,049,798 | A | * | 4/2000 | Bishop et al. | .......................... 1/1 |
| 7,302,609 | B2 | * | 11/2007 | Matena et al. | .................. 714/15 |
| 2005/0005200 | A1 | * | 1/2005 | Matena et al. | .................. 714/38 |

(Continued)

OTHER PUBLICATIONS

Jung et al., paper entitled "Performance and Availability Aware Regeneration for Cloud Based Multitier Applications," published Jun. 28, 2010; 11 pages.

(Continued)

*Primary Examiner* — Nadeem Iqbal
(74) *Attorney, Agent, or Firm* — Hartman & Citrin LLC

(57) ABSTRACT

The present disclosure relates to dynamically allocating multitier applications based upon performance and reliability of resources. A controller analyzes resources and applications hosted by the resources, and collects operational data relating to the applications and resources. The controller is configured to determine an allocation scheme for allocating or reallocating the applications upon failure of a resource and/or upon rollout or distribution of a new application. The controller generates configuration data that describes steps for implementing the allocation scheme. The resources are monitored, in some embodiments, by monitoring devices. The monitoring devices collect and report the operational information and generate alarms if resources fail.

20 Claims, 7 Drawing Sheets

(56) References Cited

U.S. PATENT DOCUMENTS

2006/0168195 A1* 7/2006 Maturana et al. ............. 709/224
2007/0067678 A1* 3/2007 Hosek et al. .................... 714/25
2007/0198982 A1* 8/2007 Bolan et al. ................... 718/104
2009/0276771 A1* 11/2009 Nickolov et al. ............. 717/177
2010/0306334 A1* 12/2010 Dehaan et al. ................ 709/208

OTHER PUBLICATIONS

U.S. Office Action mailed Oct. 24, 2012 in U.S. Appl. No. 12/911,201.

U.S. Notice of Allowance mailed Mar. 12, 2013 in U.S. Appl. No. 12/911,201.

* cited by examiner

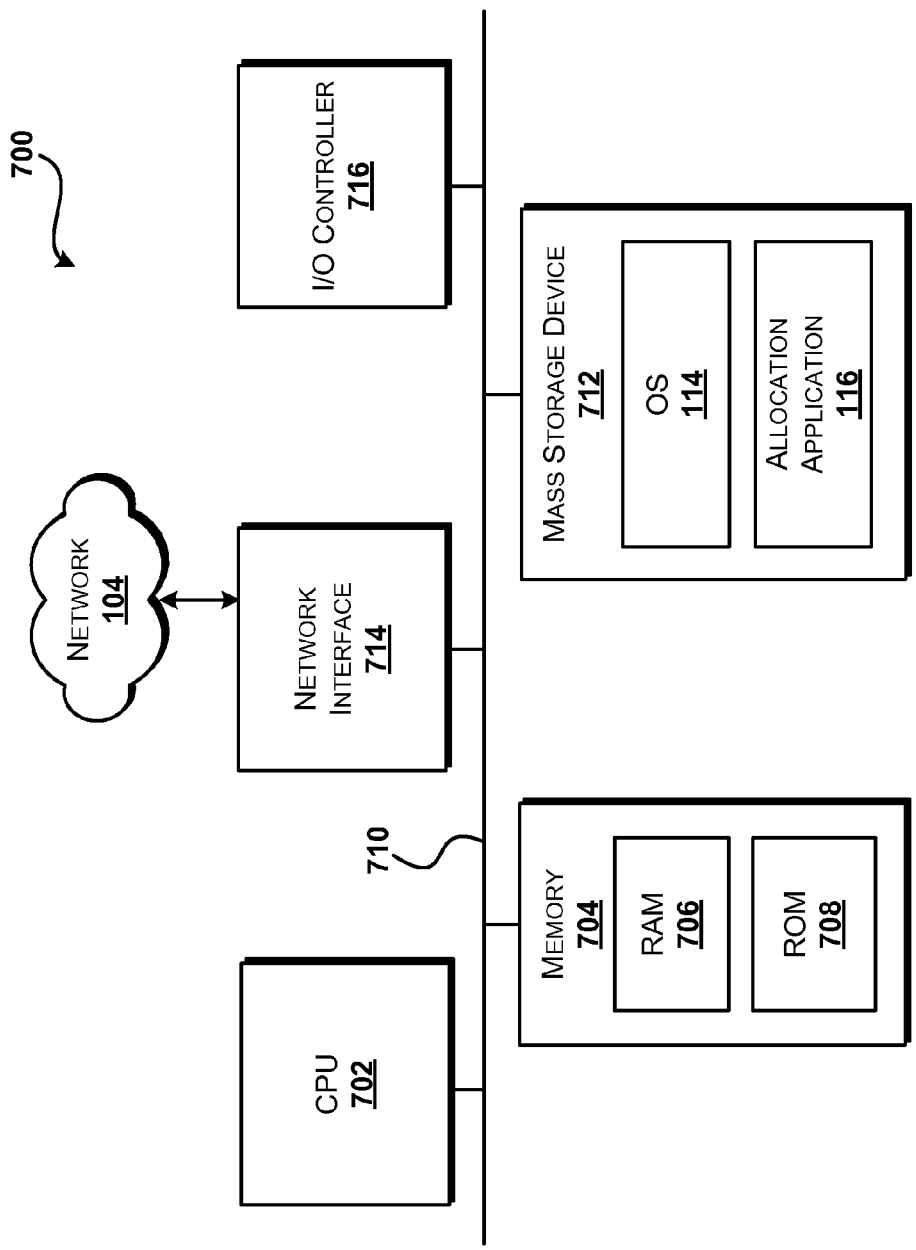

DYNAMICALLY ALLOCATING MULTITIER APPLICATIONS BASED UPON APPLICATION REQUIREMENTS AND PERFORMANCE RELIABILITY OF RESOURCES

CROSS REFERENCE TO RELATED APPLICATION

This application is a continuation of U.S. patent application Ser. No. 12/911,201, entitled "Dynamically Allocating Multitier Applications Based Upon Application Requirements and Performance and Reliability of Resources," filed Oct. 25, 2010, which is incorporated herein by reference in its entirety.

BACKGROUND

This application relates generally to resource allocation. More particularly, the disclosure provided herein relates to systems and methods for dynamically allocating multitier applications based upon application requirements and resource characteristics.

In cloud or network-based computing, resources such as hardware, software, and data can be shared and can be provided to user devices on-demand, according to user desires and needs. According to various implementations, applications are delivered online, where the software and data used to drive the applications can be stored at one or more servers or other devices that are remote from user devices accessing the applications.

In general, cloud computing infrastructure includes applications and/or services that are delivered via one or more resource tiers or levels. The resource levels include, at a highest level, a number of data centers. The data centers, in turn, can include a number of server clusters, which in turn include a number of racks. The racks can include a number of server machines. In some cases, applications may be distributed across a number of tiers including data centers, server clusters, racks, and/or servers to provide redundancy and/or to increase reliability and availability of the applications. The resources can be geographically remote from one another and may have diverse capacities, reliabilities, availabilities, latencies, and/or other performance metrics.

Determining what resources or tier of resources should host applications in cloud computing environments may require a tradeoff. In particular, hosting an application at a particular resource or tier of resources may result in good performance, but simultaneously may negatively impact application reliability and availability. Furthermore, determining how and where to replicate application components may require additional analysis. If the resource hosting particular application components goes offline, the application components or the functionality thereof may be lost.

Distributing the applications across a number of resources or resource tiers, and/or increasing the number of replicas of the applications or application components can increase reliability and availability of the applications, but simultaneously may negatively impact performance by increasing latency between the application components. Similarly, resources used to replicate applications or application components are removed from the available resources pool.

SUMMARY

The present disclosure is directed to systems and methods for dynamically allocating multitier applications based upon application requirements and performance and reliability of resources. As used herein, "reliability" is used to refer to a probability that an application will not fail before its intended shutdown, and "availability" is used to refer to a probability that the application is able to provide its service at any given time. A controller analyzes resources and applications hosted by the resources. The controller collects or receives operational data generated by the resources. The operational data describes reliability, availability, and performance requirements of the applications, as well as reliability and performance characteristics of the resources.

Upon failure of one of the resources, or upon rollout or distribution of a new application, the controller analyzes all application requirements, including performance requirements, redundancy requirements, reliability requirements, availability requirements, and the like. Additionally, the controller analyzes all resource capabilities including resource capacities, performance characteristics, reliability characteristics, and the like. The controller determines an allocation scheme that defines how the applications should be allocated or reallocated to the resources to satisfy the application requirements taking into consideration the resource capabilities.

The controller generates configuration data that describes steps to be taken or implemented with regard to the resources to implement the allocation scheme. In some embodiments, the resources are monitored by monitoring devices that generate alarms if resources fail. Additionally, the monitoring devices are configured to collect and report the operational information at regular intervals, upon resource failures, upon request, and/or at other times.

According to an aspect, a computer-implemented method for dynamically allocating resources is disclosed. The method includes computer-implemented operations for detecting a failure associated with the resources, the resources being associated with an application. The method also includes computer-implemented operations for obtaining operational data associated with the resources and the application and determining an allocation scheme for the application. The allocation scheme includes data indicating how the application should be allocated across the resources. Additionally, the method includes computer-implemented operations for outputting configuration data corresponding to the allocation scheme. The configuration data includes computer executable instructions for allocating the application across the resources according to the allocation scheme. The failure detected can include an actual or impending failure.

In some embodiments, the operational data includes application data relating to the application and resource data relating to the resources. The resource data includes, in some implementations, performance information associated with the resources and reliability information associated with the resources. In some implementations, the application data indicates a reliability requirement of the application, an availability requirement of the application, and a performance requirement of the application.

In some embodiments of the method, the reliability information includes a mean time between failures associated with the resources, and the reliability requirement includes a mean time between failures requirement associated with the application. Additionally, the availability requirement can include the probability that the application is operational and able to serve application requests at any given time. In some embodiments, the resource data includes capacity information, communication latency information, and reliability information, and the reliability information includes a mean time between failures associated with the resources.

According to some embodiments, determining the allocation scheme includes identifying a first resource level associated with the resources that satisfies the application reliability requirement and determining if the application can be allocated within a resource on this level (e.g., within one server, one rack, one server cluster, or one data center). If the allocation is successful, the method can include outputting configuration information. According to some embodiments, choosing the lowest level that satisfies the reliability requirement may be considered to optimize application performance due to lower network latencies between resources on lower levels, e.g., within a rack. If the application cannot be allocated within this resource level, the method further can include computer implemented operations for choosing a reconfiguration action, from multiple possible reconfiguration actions, to allocate the application within the given resources. Such reconfiguration actions may include reducing the amount of resources allocated to an application component or placing the application on a higher resource level, which may have more resources. This process can be repeated until the application is allocated.

In some embodiments, the first resource level corresponds to a lowest resource tier of a plurality of resource tiers of the resources. The resource tiers can include a data center tier, a server cluster tier, a rack tier, and a server tier. In some embodiments, the reconfiguration action is chosen by executing a greedy search algorithm, and determining if the application can be allocated includes executing a fit algorithm.

According to another aspect, a computer-readable storage medium is disclosed. The computer-readable storage medium has computer executable instructions stored thereupon that, when executed by a controller, cause the controller to detect a failure of resources in communication with the controller, the resources hosting a multitier application. The medium further can include instructions for obtaining, in response to detecting the failure, operational data associated with the resources and the application. The operational data can include application data relating to the application and resource data relating to the resources. The medium further includes instructions for determining an allocation scheme for the application. The allocation scheme includes data indicating how the application should be allocated across the resources. The medium also can include instructions that cause the controller to output configuration data corresponding to the allocation scheme, the configuration data including computer executable instructions for allocating the application across the resources according to the allocation scheme.

According to some embodiments, detecting the failure includes receiving an alarm generated by a monitoring device operating in communication with the resources. In some embodiments, the resource data includes performance information associated with the resources and reliability information associated with the resources, and the application data indicates a reliability requirement of the application and a performance requirement of the application. The resource reliability information includes a mean time between failures associated with the resources, and the reliability requirement includes a mean time between failures requirement associated with the application.

In some embodiments, the computer-readable storage medium also includes computer executable instructions that, when executed by the controller, cause the controller to identify a resource level associated with the resources that satisfies the application reliability requirements and determining if the application can be allocated within a resource on this level. According to various embodiments, allocating an application within a resource of a level can include allocating the application on a server, a rack, a server cluster, or a data center. If the allocation is successful, the method can include outputting configuration information. If the application cannot be allocated within the resource level, the method further can include computer implemented operations for choosing a reconfiguration action, from multiple possible reconfiguration actions, for allocating the application within the available resources. The reconfiguration actions may include reducing the amount of resources allocated to an application component or placing the application on a higher resource level with more resources. This process can be repeated until the application is allocated.

According to yet another aspect, another computer-implemented method for dynamically allocating resources is disclosed. The method includes computer-implemented operations for detecting a failure associated with the resources, the resources being associated with an application and including a plurality of resource tiers. The method also includes obtaining operational data associated with the resources and the application. The operational data includes application data relating to the application and resource data relating to the resources. The method also includes determining an allocation scheme for the application, the allocation scheme including data indicating allocation of the application across the resources to adjust for the failure detected. Configuration data is output, the configuration data corresponding to the allocation scheme and including computer executable instructions for allocating the application across the resources according to the allocation scheme.

According to some embodiments, the resource data includes performance information associated with the resources and reliability information associated with the resources and the application data indicates an availability requirement of the application, a reliability requirement of the application, and a performance requirement of the application. The resource reliability information includes a mean time between failures associated with the resources. The application reliability requirement includes a mean time between failures requirement associated with the application and a probability that the application is able to serve application requests at any given time.

The method also includes, in some implementations, identifying a resource level associated with the resources that satisfies the application reliability and/or availability requirements, if the application can be allocated within a resource on this level (e.g., within one server, one rack, one server cluster, or one data center). If the allocation is successful, the method can include outputting the configuration information. If the application cannot be allocated within this resource level, the method further can include computer implemented operations for choosing a reconfiguration action, from multiple possible reconfiguration actions, for allocating the application within the given resources. The reconfiguration actions may include reducing the amount of resources allocated to an application component or placing the application on a higher resource level, which can have more resources. This process can be repeated until the application is allocated.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure, and be protected by the accompanying claims.

BRIEF DESCRIPTION OF THE DRAWINGS

Figures 5A, 5B:
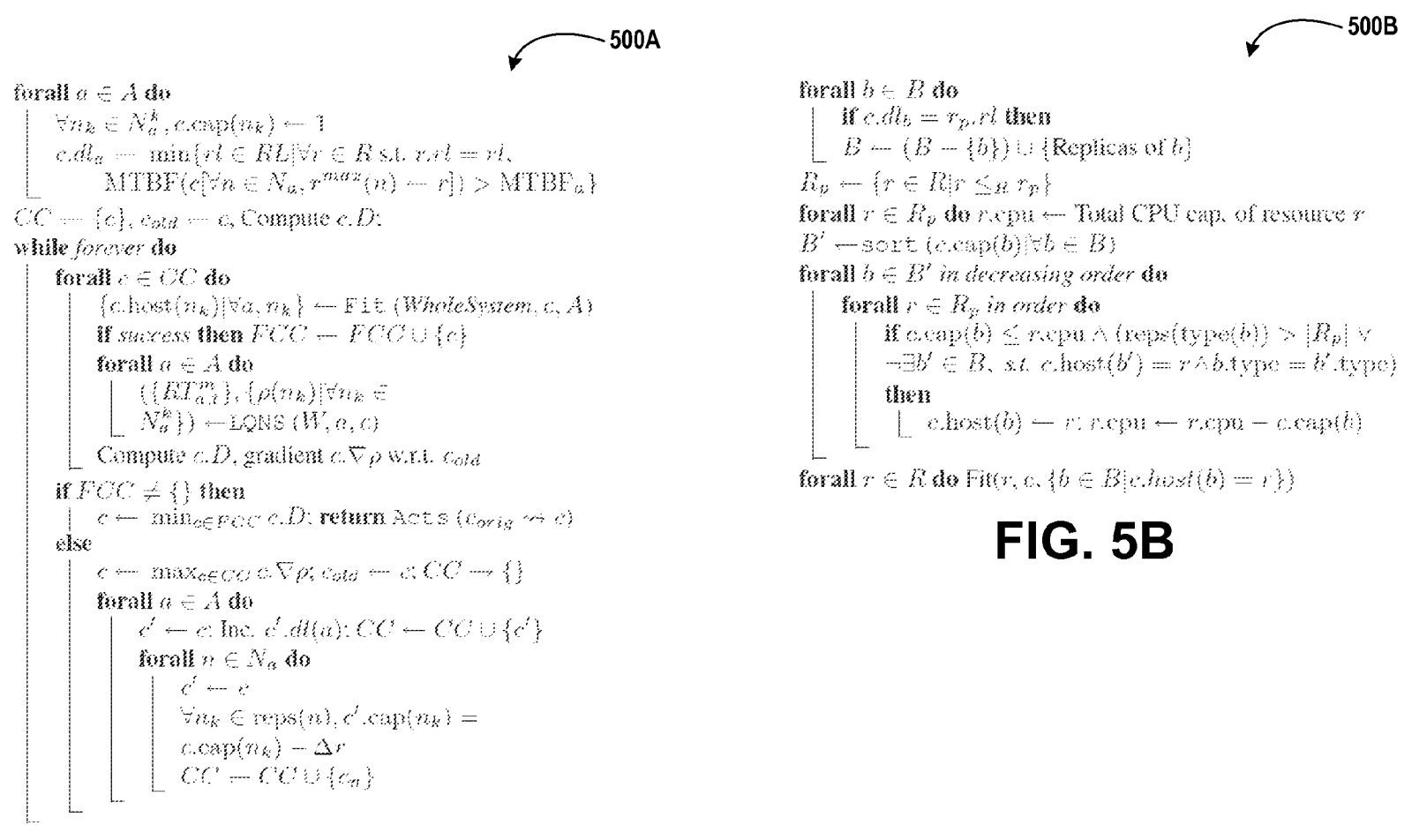

FIGS. 5A and 5B illustrate algorithms for determining the allocation scheme, according to an exemplary embodiment.

FIG. 7 is a computer architecture diagram illustrating an exemplary computer hardware and software architecture for a device capable of implementing aspects of the embodiments presented herein.

DETAILED DESCRIPTION

Figure 1:
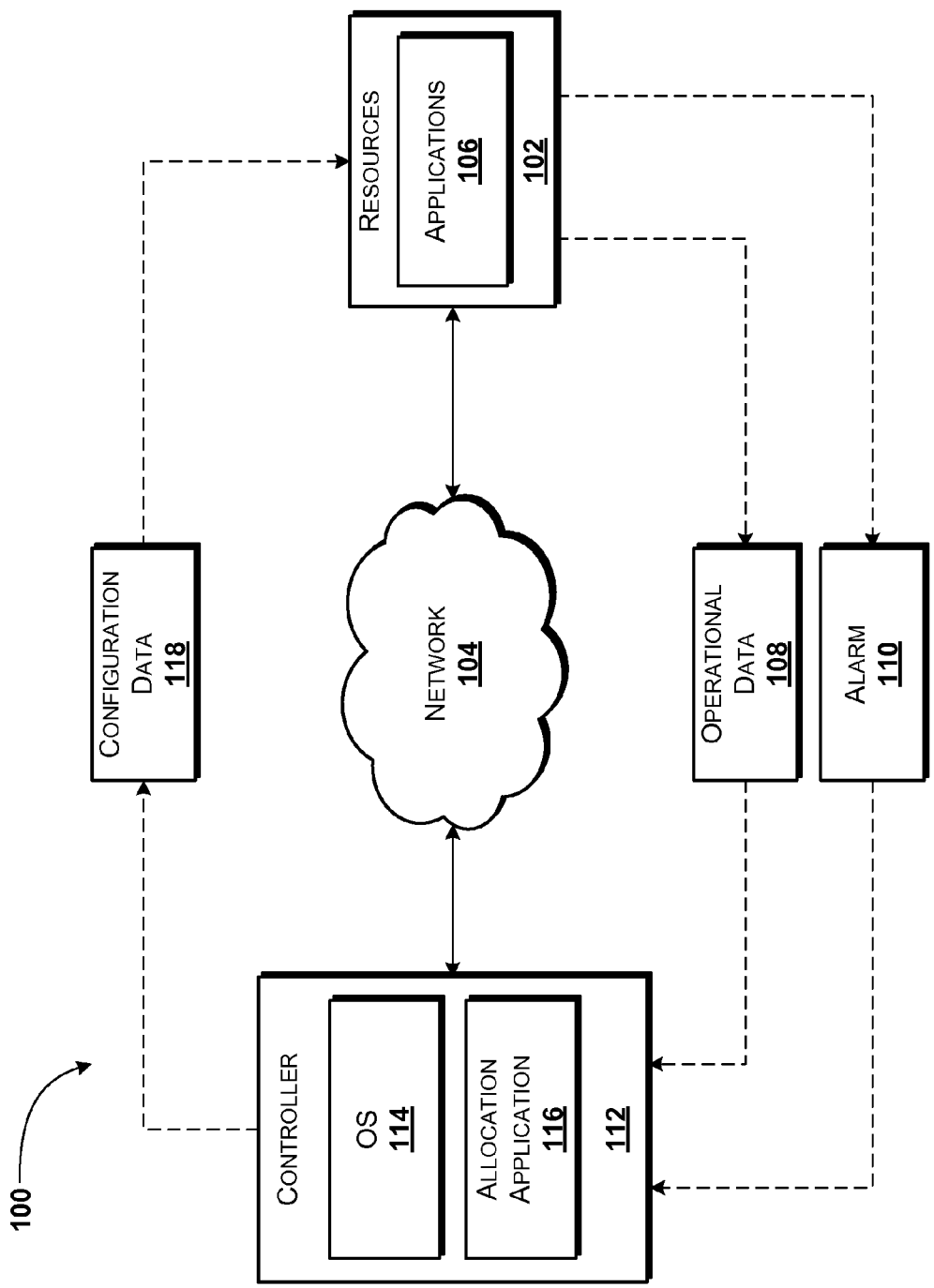
FIG. 1 is a system diagram schematically illustrating an exemplary operating environment for various embodiments disclosed herein.

The following detailed description is directed to methods, systems, and computer-readable media for dynamically allocating multitier applications based upon performance and reliability of resources. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

The present disclosure discloses various systems and methods for allocation of application components or application component bundles, as well as configuration and/or reconfiguration of resource hierarchies to accommodate allocated applications and/or application bundles. The word "application," and variations thereof, is used in the description and claims to include not only single tier or single component applications, but also to refer to multitier or multi-component applications that are executed or provided by a combination of tiers. In particular, a multitier application may be provided by multiple components and/or component types that collectively represent a presentation tier, a logic tier, a data tier, and/or additional or alternative tiers. According to one contemplated embodiment, an application being allocated includes a web server tier, e.g., an APACHE server, an application server tier, e.g., a TOMCAT server, and a database tier, e.g., a device configured to execute SQL queries and/or other queries. It should be understood that these embodiments are exemplary, and merely illustrative of multitier applications and/or resource hierarchies. Also, it should be understood that the concepts and technologies disclosed herein can be used to allocate components associated with various embodiments of service-oriented architectures.

In light of the multitier nature of the applications referred to herein, it should be understood that various components of the applications can be provided by one or more types of resources. The resources, meanwhile, can have varied reliability and/or performance characteristics. The concepts and technologies disclosed herein support allocation of various applications, each having varied performance and reliability requirements, across these resources having varied performance and reliability characteristics. Thus, application components with varied performance and/or reliability requirements can be distributed across resources with varied structures, performance characteristics, and/or reliability characteristics.

The concepts and technologies disclosed herein also may be used to support allocation of multitier applications across virtual machines. Thus, it should be understood that the environments across which the applications are distributed may include a number of virtual machines and/or resources. As such, the allocation schemes determined according to the concepts and technologies disclosed herein may be implemented via virtual machine capabilities, which may be invoked to set limits on the capacities of resources available, to move application components from one host to another, and the like.

Furthermore, while the disclosure refers to capacity of resources in terms of CPU capacity, it should be understood that various aspects of resources can be treated as capacity and can be used to drive or limit application allocation. In some embodiments, resources capacity is measured as CPU capacity, memory capacity, available bandwidth, storage capacity, access speed, and/or other capacities associated with the resources. Furthermore, it should be understood that the resources capacities considered can include combinations of resource capacities and/or aspects of the resources. Thus, the disclosed embodiments, wherein CPU capacity is considered, should be understood to be exemplary, and should not be construed as being limiting in any way.

Similarly, while the disclosure addresses performance characteristics in terms of response time, it should be understood that other performance characteristics may be considered. In some embodiments, network latency or other performance characteristics are considered. Also, various dependability characteristics can be considered in addition to, or instead of, those disclosed herein. Thus, the disclosed embodiments should be understood to be exemplary, and should not be construed as being limiting in any way.

Referring now to FIG. 1, aspects of an exemplary system 100 for dynamically allocating multitier applications based upon performance and reliability of resources are described, according to an exemplary embodiment. The system 100 includes one or more resources 102 operating on or in communication with a communications network 104 ("network"). According to various embodiments, the network 104 includes one or more communications networks including, but not limited to, cellular networks, packet data networks, and/or public switched telephone networks. These and other aspects of an exemplary embodiment of the network 104 are described below with reference to FIG. 6.

The resources 102 can include one or more types of computing and storage resources for storing and hosting data to provide one or more applications or services 106 (collectively referred to herein as "applications 106"). According to various embodiments, the resources 102 are organized into hierarchal groupings of resource components including, but not limited to, data centers, server clusters, racks, servers, databases, processors, and the like. More particularly, the resources 102 may include data centers, which may include a number of resource components such as server clusters. Each of the server clusters may include a number of racks, and each of the racks in the server clusters may include a number of server machines. Thus, "resources," as used herein, includes data centers, server clusters, racks, and/or server machines.

Latency may vary between the resources 102. For example, latency between two hosts of a rack may be less than, greater than, or equal to the latency between one host of a first rack and a second host of a second rack. Similarly, latency between data centers may be less than, greater than, or equal to the latency between server clusters, racks, or server machines. In some embodiments, latency between the resources 102 is greater at higher levels relative to lower levels. For example, latencies of the resources 102 at the data center level may be greater than latencies of the resources 102 at the server level. Data indicating the respective latencies, performance capabilities, capacities, and the like of the resources 102 can be generated or stored as the operational data 108. The operational data 108 can be transmitted or made available to one or more devices or nodes on-demand, according to one or more scheduled updates, and/or upon occurrence of a failure of a resource component, as is explained in more detail herein.

According to various embodiments, the applications 106 are distributed across the resources 102 to provide desired levels of redundancy, reliability, and performance. For example, the applications 106 may be distributed across a number of racks to provide redundancy of the applications 106. Thus, replicated components of the applications 106 can be provided in the event that one of the racks hosting the applications 106 fails.

Although not illustrated, none, some, or all of the resources 102 can include or can be communicatively linked to one or more monitoring devices and/or software. The monitoring devices and/or software are configured to monitor usage, capacity, performance, reliability, and function of the resources 102. The monitoring devices and/or software can trigger an alarm 110 if one or more of the resources 102 fails.

Before, during, or after the applications 106 are deployed or distributed across the resources 102, the issues of reliability and performance may be evaluated by one or more evaluation devices operating on or in communication with the resources 102 and/or the network 104. Generally speaking, the applications 106 are distributed in a manner such that performance of the applications 106 is maximized, while minimum reliability requirement of the applications 106 is met or exceeded.

According to some embodiments, the functions of the one or more evaluation devices are provided by a controller 112 operating on or in communication with the network 104 and/or the resources 102. The controller 112 is configured to execute an operating system 114 and one or more application programs including, but not limited to, an allocation application 116. The operating system 114 is a computer program for controlling the operation of the controller 112. Examples of operating systems include, but are not limited to, the WINDOWS family of operating systems from MICROSOFT CORPORATION, LINUX, SYMBIAN from SYMBIAN LIMITED, BREW from QUALCOMM CORPORATION, MAC OS from APPLE CORPORATION, and FREEBSD.

The allocation application 116 is an executable program configured to execute on top of the operating system 114 to provide the functionality described herein for dynamically allocating multitier applications based upon performance and reliability of resources. According to various embodiments, the allocation application 116 is configured to determine an allocation scheme that defines how the applications 106 should be allocated across the resources 102. According to various embodiments, the allocation application 116 determines that the applications 106 should be allocated or reallocated in response to receiving the alarm 110 and/or via querying the resources 102, either or both of which may indicate that one or more of the resources 102 have failed and/or are about to fail. The allocation application 116 also is configured to determine that a new application 106 is ready for deployment across the resources 102.

The allocation application 116 is configured to determine an allocation or reallocation scheme upon determining that the applications 106 should be allocated and/or reallocated. According to various embodiments, the allocation application 116 analyzes the operational data 108, which as mentioned above indicates operational capabilities of the resources 102 and operational requirements of the applications 106. The allocation application 116 determines, based upon the operational data 108, how the applications 106 should be distributed across the resources 102 to maintain desired or needed performance and/or reliability requirements associated with the applications 106.

The allocation application 116 also is configured to generate configuration data 118. According to some embodiments, the configuration data 118 details how the applications 106 should be allocated across the resources 102 to reconfigure the resources 102 in accordance with the determined allocation scheme. According to some embodiments, the configuration data 118 includes instructions that, when implemented by the resources 102, cause the resources 102 to allocate, reallocate, and/or redistribute the applications 106 across the resources 102. The configuration data 118 also can be executed or interpreted by other devices and/or nodes, any of which can issue or implement commands for configuring and/or reconfiguring the resources 102.

According to various embodiments, the allocation application 116 is configured to execute a number of algorithms to determine the allocation scheme and/or to generate the configuration data 118. In one exemplary embodiment, described in more detail below with reference to FIGS. 3-4, the allocation application 116 executes two algorithms, a search algorithm and a fit algorithm, which collectively are executed by the allocation application 116 to determine the allocation scheme for the applications 106, and to generate the configuration data 118. Exemplary embodiments of the search algorithm and the fit algorithm are illustrated in FIGS. 5A and 5B, respectively.

Generally speaking, the controller 112 determines an allocation scheme that maintains desired reliability and redundancy requirements for each of the applications 106 while minimizing any performance degradation of the applications 106. According to some embodiments, the controller 112 bases allocation, at least partially, upon degradation of the applications 106. The degradation D of the applications 106 can be defined by a degradation function, which according to an exemplary embodiment is defined as $$D = \sum_{a \in A, t \in T_a} \gamma_{a,t}(RT^m_{a,t} - RT^g_{a,t}),$$

where $RT^g_{a,t}$ denotes a goal response time for a transaction type t belonging to an application a from the applications 106, and where $RT^m_{a,t}$ denotes the measured mean response time for a particular application a from the applications 106 and the transaction type. In some embodiments, the controller 112 minimizes the performance degradation by minimizing this degradation function. The weights $\gamma_{a,t}$ are used to weight transactions according to a varying importance and frequency of occurrence. These weights can be assigned according to any desired considerations. In one exemplary embodiment, the weights are assigned as a fraction of transactions of type t in the workload w of the applications 106. Assigning the weights in this manner makes the degradation D equal to the mean response time degradation of the applications 106, thereby allowing easy comparison of various control strategies.

According to various embodiments, the degradation function is minimized over all possible configurations of the resources 102. Each configuration can specify an assignment of each application component replica to a particular resource 102, e.g., a physical server machine. It should be understood that the choice of a particular physical server machine is not influenced merely by the machine's available CPU capacity, but also by the location of the physical machine in the resource hierarchy with respect to other components of the application 106.

With a known set of reliability values such as mean time between failures ("MTBF") for each resource level of the resources 102, and with a known placement of the application components of the applications 106 on the resources 102, MTBF values for each of the applications 106 can be computed. These MTBF values are used by the controller 112 as constraints to determine what resource levels of the resources 102 should be used to host the application components of the applications 106. According to an exemplary embodiment, the MTBF in a particular system configuration c, i.e., in a particular assignment configuration of application components of the applications 106 to the resources 102, is defined as $$MTBF_a(c) = \left( \sum_{\substack{\forall r \in R \, s.t. \, \exists n_a \in N_a \\ s.t. \, r^{max}(n_a) \leq^* _R r}} MTBF_r^{-1} \right)^{-1},$$

wherein $n_a$ corresponds to replicas of application components of the applications 106, $N_a$ corresponds to component types of the applications 106, and for each type $n_a \in N_a$, let $r^{max}(n_a)$ define the highest resource level of the resources 102 in which the replicas $n_a$ of the application components are contained.

As will be explained in more detail below with reference to FIGS. 2-5B, in some embodiments, the search algorithm is a greedy algorithm that allocates the applications 106 across the resources 102, beginning with an ideal configuration that ignores capacity constraints of the resources 102. The ideal configuration is then analyzed by the allocation application 116 via execution of a fit algorithm that attempts to allocate the application components to the resources 102. If the fit algorithm does not accept the ideal configuration, the allocation application 116 degrades the configuration and passes that configuration to the fit algorithm. The allocation application 116 iteratively degrades the configuration until accepted by the fit algorithm.

The ideal configuration is identified by identifying the lowest resource level or tier that satisfies the reliability and/or redundancy requirements of the applications 106. The lowest resource level or tier is used first, as the performance of the applications 106 is assumed to improve as application components are placed at lower levels. This assumption is based upon another assumption, i.e., that latency is higher at higher resource tiers relative to lower resource tiers, particularly if capacity constraints of the resources 102 are ignored.

The allocation scheme is identified by the allocation application 116 via identifying a candidate configuration using the search algorithm. The allocation application 116 then determines if the allocation scheme identified by the search algorithm is feasible, from a network capacity perspective, by determining if the allocation scheme satisfies the fit algorithm. Once an allocation scheme that satisfies the fit algorithm is identified, the allocation application 116 generates the configuration data 118, which can be used to reconfigure the resources 102 in accordance with the allocation scheme. These and additional features of the allocation application 116 will be described in more detail below, particularly with reference to FIGS. 2-4.

FIG. 1 illustrates one group of resources 102, one network 104 and one controller 112. It should be understood, however, that some implementations of the system 100 include multiple groups of resources 102, multiple networks 104, and multiple controllers 112. Therefore, the illustrated embodiment should be understood as being exemplary, and should not be construed as being limiting in any way.

Figure 2:
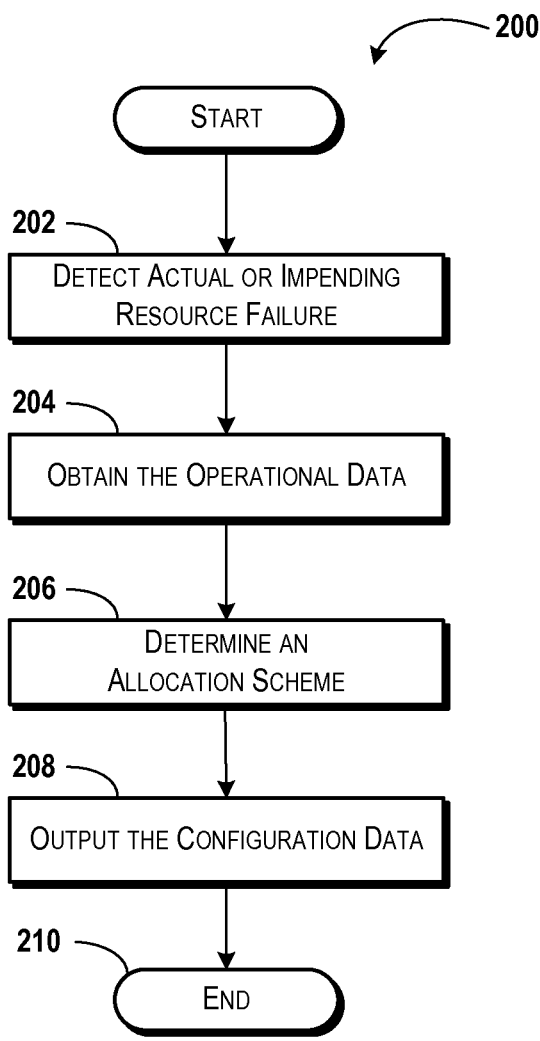
FIG. 2 is a flow diagram showing aspects of a method for dynamically allocating multitier applications based upon performance and reliability of resources, according to an exemplary embodiment.

Turning now to FIG. 2, aspects of a method 200 for dynamically allocating multitier applications based upon performance and availability of resources will be described in detail, according to an exemplary embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the methods disclosed herein can be ended at any time and need not be performed in its entirety. Some or all operations of the methods, and/or substantially equivalent operations, can be performed by execution of computer-readable instructions included on a computer-storage media, as defined above. The term "computer-readable instructions," and variants thereof, as used in the description and claims, is used expansively hereinto include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For purposes of illustrating and describing the concepts of the present disclosure, the methods disclosed herein are described as being performed by the controller 112. It should be understood that the controller 112 and/or additional or alternative devices and/or network nodes can provide the functionality described herein via execution of one or more application programs including, but not limited to, the allocation application 116. Furthermore, it should be understood that the functionality of the allocation application 116 can be provided by any number of devices or network nodes, and is not limited to the controller 112 illustrated in the FIGURES. Thus, the illustrated embodiment is exemplary, and should not be viewed as being limiting in any way.

The method 200 begins at operation 202, wherein the controller 112 receives an indication that a resource 102 has failed or is about to fail. According to various embodiments, the controller 112 receives the alarm 110 from a monitoring or alarm component associated with the resources 102. According to other embodiments, the controller 112 periodically queries the resources 102 or a monitoring or alarm system associated therewith to determine if any failures have been detected.

From operation 202, the method 200 proceeds to operation 204, wherein the controller 112 obtains the operational data 108 associated with the resources 102. As mentioned above, the operational data 108 includes data indicating what resources 102 are online, capacities associated with the resources 102, latencies of the resources 102, reliability of the resources 102, and the like. Thus, the operational data 108 indicates all available resources 102, as well as performance characteristics associated with the available resources 102.

Additionally, the configuration data 108 includes reliability, redundancy, and performance requirements associated with the applications 106. The reliability and performance requirements can indicate, for example, a desired amount of redundancy for a particular application 106, acceptable limits for downtime, latency, response time, and the like. In some embodiments, the configuration data 108 includes data indicating a Mean Time Between Failures ("MTBF") and/or a Mean Time To Repair ("MTTR") for the resources 102 and/or the application 106.

According to some implementations, the controller 102 obtains the operational data 108 associated with the resources 102 and/or the applications 106 via one or more queries of the resources 102, databases, servers, and/or other devices or network nodes. In other embodiments, the operational data 108 is automatically provided to the controller 112 when the alarm 110 is generated, based upon scheduled updates, and/or at other times.

From operation 204, the method 200 proceeds to operation 206, wherein the controller 112 determines an allocation scheme for the applications 106. According to various embodiments, the controller 112 may allocate applications 106 previously hosted by the failed resource 102 as well as other applications 106 that were not affected by the actual or impending failure. The controller 112 is configured to base the allocation scheme on a number of factors. For example, the controller 112 can base the allocation scheme, at least partially, upon the configuration data 108 indicating reliability requirements for the applications 106, desired performance characteristics for the applications 106, and the like. Similarly, the controller 112 can base the allocation scheme upon the configuration data 108 indicating the reliability of the resources 102.

The controller 112 considers these and other data to identify the resources 102 that can host the applications 106, the applications 106 that can or may be allocated as part of the allocation scheme, and how and where the applications 106 should be allocated in accordance with the allocation scheme. According to various embodiments, determining the allocation scheme includes generating the configuration data 118. As mentioned above, the configuration data 118 includes instructions for allocating the applications 106 across the resources 102. It should be understood that the configuration data 118 can include instructions for relocating applications 106 from some resources 102 to other resources 102. If resources 102 have failed or are about to fail, the allocation scheme may allocate the applications 106 across the resources 102 in a manner that excludes or avoids the failed or failing resources 102.

Additionally, it should be understood that the applications 106 allocated by the controller 112 can include not only applications 106 hosted by failed or failing resources 102, but also applications 106 that are being reallocated to accommodate the allocated applications 106. According to various embodiments, the controller 112 seeks to maximize performance of the applications 106 while meeting the minimum reliability requirements specified for the applications 106. Additional details of determining an application allocation scheme are illustrated and described in more detail in FIGS. 3-4.

From operation 206, the method 200 proceeds to operation 208, wherein the controller 112 allocates the applications 106. According to some embodiments, the controller 112 issues the configuration data 118 determined in operation 206 to nodes or devices responsible for allocating the applications 106. As explained above with reference to operation 206, the configuration data 118 details how the applications 106 should be allocated across the resources 102. As such, the configuration data 118 includes instructions that, when implemented, allocate, reallocate, and/or redistribute the applications 106 across the resources 102. From operation 208, the method 200 proceeds to operation 210. The method 200 ends at operation 210.

Although the method 200 has been described with relation to failed or failing resources 102, it should be understood that an allocation scheme also can be generated to accommodate deployment and/or distribution of new applications 106, in addition to or instead of accommodating applications 106 hosted by failed or failing resources 102. Thus, in some embodiments, the operation 202 includes detecting a new application 106 for distribution across the resources 102.

Figure 3:
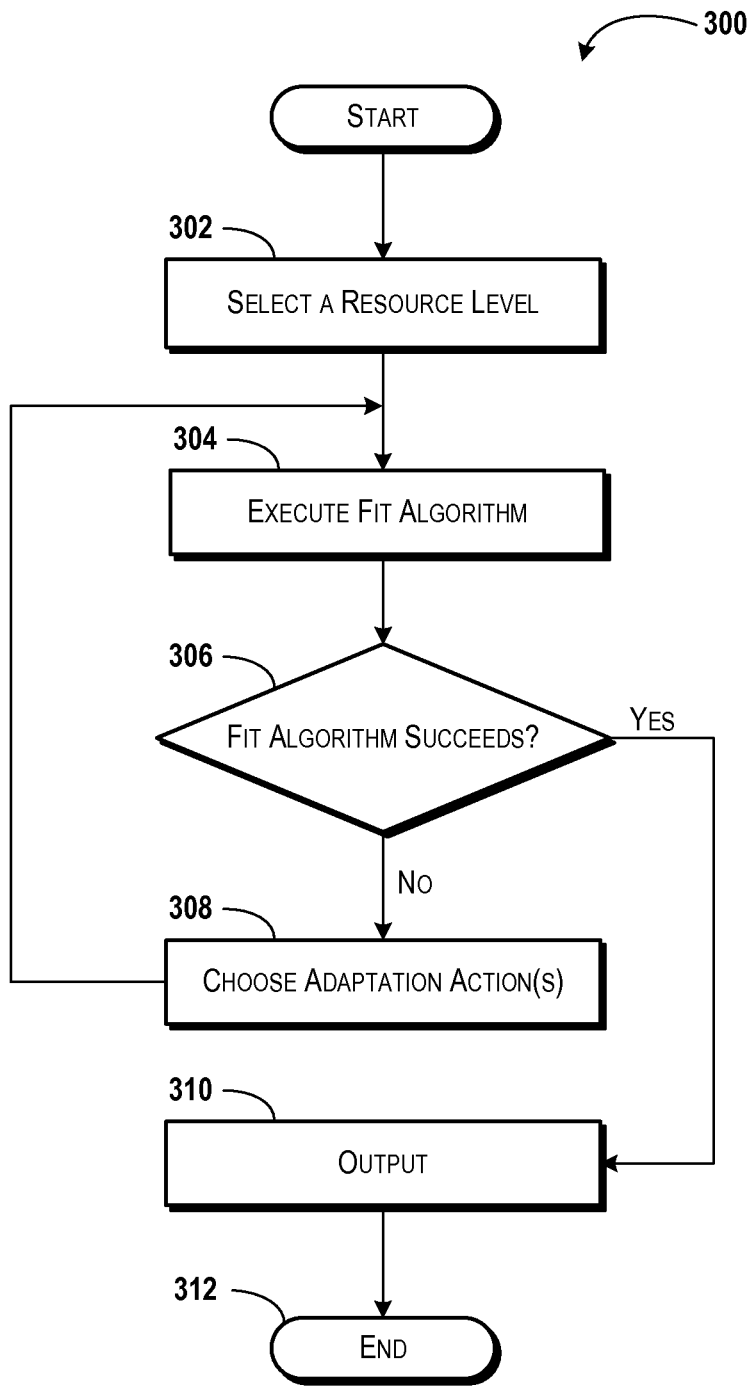
FIG. 3 is a flow diagram showing aspects of a method for determining an allocation scheme, according to an exemplary embodiment.

Turning now to FIG. 3, aspects of a method 300 for determining an application allocation scheme will be described in detail, according to an exemplary embodiment. According to various embodiments, the operations described herein with respect to the method 300 correspond to determining an allocation scheme as described above with reference to operation 206 of FIG. 2. As explained above with reference to operation 206 of FIG. 2, the controller 112 is configured to determine how to allocate the applications 106 across the resources 102 upon an actual or impending failure of the resources 102 and/or upon rollout of a new application 106.

The method 300 begins at operation 302, wherein the controller 112 selects a resource level for an application tier under consideration. According to various embodiments, the controller 112 initially selects for the application tier under consideration, the lowest resource level for which a specified or determined reliability level, e.g., a reliability SLA, is satisfied. The controller 112 can identify the lowest resource level for which the reliability level is satisfied based upon a number of considerations. In some embodiments, the controller 112 makes this determination based upon determined or known MTBF values associated with each resource level and determined or known MTBF values associated with each replication level in each application tier. This embodiment is exemplary, as the controller 112 can base this determination upon additional or alternative application tier and/or resource level metrics.

From operation 302, the method 300 proceeds to operation 304, wherein the controller 112 executes a fit algorithm to determine if the resource level selected in operation 302 will accommodate all components of the application tier being considered. Exemplary methodology for evaluating the resource level via execution of the fit algorithm is illustrated and described below with reference to FIG. 4. From operation 304, the method 300 proceeds to operation 306, wherein the controller 112 determines if execution of the fit algorithm was successful. If the controller 112 determines that execution of the fit algorithm was not successful, the method 300 proceeds to operation 308. In some embodiments, the controller 112 determines that execution of the fit algorithm was not successful because the resource demand was higher than the available capacity. In these and other instances in which execution of the fit algorithm was not successful, the method 300 proceeds to operation 308, wherein the controller 112 chooses an adaptation action to adapt the configuration. In choosing the adaptation action, the controller 112 can be configured to select an adaptation action that will minimize degradation of the performance for a given reduction in resource demand. In some implementations, the controller 112 accomplishes this by maximizing the gradient function.

Exemplary adaptation actions that may be invoked by the controller 112 include, but are not limited to, particular actions for each application tier. In particular, for each application tier, the control 112 can reduce the resource capacity allocated to the particular application tier components and/or move the application tier and/or application tier components to the next higher resource level. In some exemplary embodiments, moving an application tier or application tier component includes moving component from one rack to a server cluster tier with multiple racks, or the like.

From operation 308, the method 300 returns to operation 304, wherein the controller 112 executes the fit algorithm to evaluate the new configuration based upon the adaptation actions determined in operation 308. The operations 304-308 are iterated until the controller 112 determines in operation 306 that the fit algorithm was successful. If the controller determines, during any iteration of operation 306 that execution of the fit algorithm was successful, the method 300 proceeds to operation 310.

In operation 310, the controller 112 outputs actions needed to adapt the configuration from the original configuration to the configuration determined in operation 308. The output generated in operation 310 can include a set of actions for increasing or decreasing resource capacity, migrating application tier components, and the like, as explained above. From operation 310, the method 300 proceeds to operation 312. The method 300 ends at operation 312.

Figure 4:
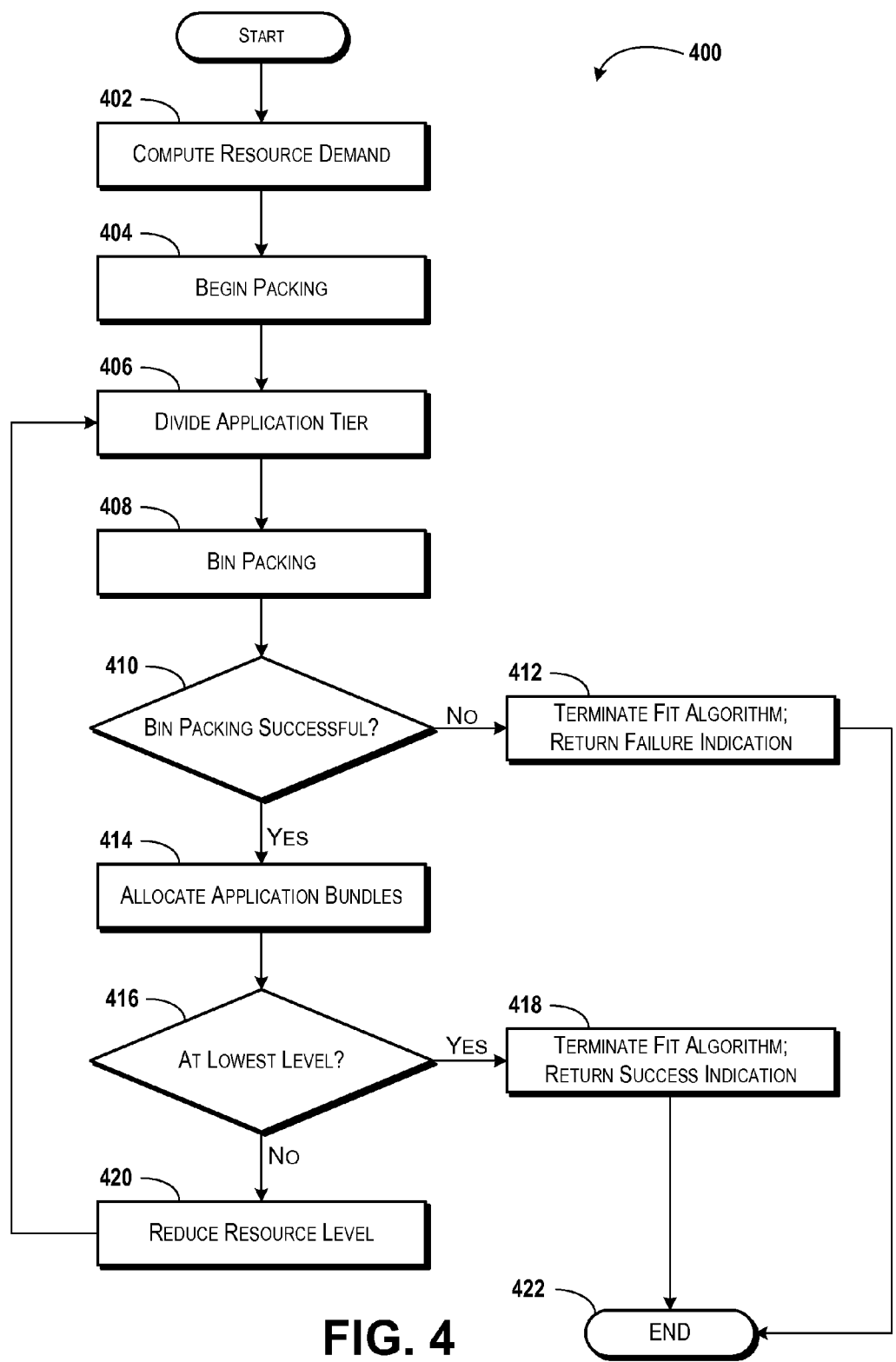
FIG. 4 is a flow diagram showing aspects of a method for executing a fit algorithm, according to an exemplary embodiment.

Turning now to FIG. 4, aspects of a method 400 for determining an application allocation scheme will be described in detail, according to an exemplary embodiment. According to various embodiments, the operations described herein with respect to the method 400 correspond to determining an allocation scheme as described above with reference to operation 304 of FIG. 3. As explained above with reference to operation 304 of FIG. 3, the controller 112 is configured to execute a fit algorithm to determine how to allocate the applications 106 across the resources 102.

The method 400 begins with operation 402, wherein the controller 112 computes a resource demand created by each application replica. According to various embodiments, the controller 112 computes the resource demand based upon a performance model such as a queuing network model ("QNS"), a resource level such as a reliability SLA, and/or other models, benchmarks, or agreed-upon performance metrics. According to various implementations, an aggregate resource demand for each application tier is determined by the controller 112 as being equal to the sum of resource demands of each application replica in the application tier. The aggregate resource demand for each application, then, can be computed by the controller 112 as being equal to the sum of the aggregate resource demands of each of application tier associated therewith.

From operation 402, the method proceeds to operation 404, wherein the controller 112 begins packing of the resource levels. In some embodiments, the controller 112 begins the packing process by first packing the highest resource level. For example, the controller 112 may begin by packing a data center. According to various implementations, the controller 112 initially treats each application being allocated as a single bundle, wherein the single bundle includes each of the application tiers associated with the application being allocated.

From operation 404, the method 400 proceeds to operation 406. At operation 406, the controller divides one or more application tiers into separate bundles, if the current resource level equals the resource level for any application tier. If the current resource level does not equal the resource level for any application tier, the method 400 proceeds to operation 408. If the controller 112 divides the application tiers into separate bundles, the application tier may be divided such that one bundle is generated for each application replica in the application tier. In some embodiments, the volume of each bundle is equal to the resource demand of the each application replica.

From operation 406, the method proceeds to operation 408. At operation 408, the controller 112 performs a bin packing operation. In some embodiments, the controller 112 packs the bundles into bins while avoiding placing identical application replicas of the application in the same application tier. More particularly, the controller 112 can avoid packing bundles that are not part of a larger bundle in the same bin, corresponding to the same application tier.

According to various embodiments, each bin represents an instance of the current resource level. For example, a bin may represent a particular data center such as, for example, a first data center in New York City referred to herein as NYCDC1. The volume of each bin can be determined by the controller 112 as being equal to the total amount of the resources available in the instance, i.e., a sum of all CPU capacity in all servers in NYCDC1. The volume of each bundle can be determined to be equal to a resource demand associated with the bundle.

From operation 408, the method 400 proceeds to operation 410, wherein the controller 112 determines if the bin packing operation was successful. If the controller 112 determines that the bin packing operation was not successful, the method 400 proceeds to operation 412, wherein the controller 112 terminates the fit algorithm and generates a failure indication. The failure indication can indicate that the resource demand associated with the application tier being evaluated exceeded available resource level capacity.

If the controller 112 determines in operation 410 that the bin packing operation was successful, the method 400 proceeds to operation 414, wherein the controller 112 allocates each application bundle to a specific instance at the current resource level. For example, the controller 112 may allocate a particular application bundle referred to herein as "application bundle A" to a particular resource referred to herein as "resource 1." This embodiment is exemplary, and should not be construed as being limiting in any way.

From operation 414, the method 400 proceeds to operation 416, wherein the controller 112 determines if the current resource level is the lowest level of the resource hierarchy. In one contemplated embodiment, the resource hierarchy includes a physical machine level, a rack level, a cluster level, a data center level, and other levels. In this embodiment, the lowest resource level of the resource hierarchy corresponds to the physical machine level. It should be understood that this embodiment is exemplary.

If the controller 112 determines at operation 416 that the current resource level is the lowest level of the resource hierarchy, the method 400 proceeds to operation 418. At operation 418, the controller 112 terminates the fit algorithm and generates a success indication indicating that execution of the fit algorithm was successful. More particularly, the success indication indicates that the fit algorithm was successful and is accompanied with data indicating the successful bin packing assignment of application replicas to resource level instances as determined in operation 408.

If the controller determines at operation 416 that the current resource level is not the lowest level of the resource hierarchy, the method 400 proceeds to operation 420. At operation 420, the controller 112 reduces the current resource level to the next lowest level. For example, if the current resource level corresponds to a data center level in the resource hierarchy, the controller 112 lowers the current resource level to a server cluster level, the next lowest level in the resource hierarchy according to some exemplary embodiments. After decrementing the current resource level to the next lowest resource level in the resource hierarchy, the controller 112 recursively attempts to bin pack the application bundles by executing the operations 406-416 until the controller 112 determines that the bin packing was not successful (at operation 410), or until the controller 112 determines that the current resource level is the lowest level in the resource hierarchy (at operation 416). The method 400 proceeds to operation 422 from operations 412 or 418. The method ends at operation 422.

Turning now to FIGS. 5A-5B, a search algorithm 500A and a fit algorithm 500B are illustrated, according to an exemplary embodiment. As explained above, in some embodiments, the search algorithm 500A is a greedy algorithm that starts with what is considered, in some embodiments, to be the best possible configuration of the applications 106, irrespective of capacity constraints of the resources 102. The controller 112 executes the algorithm through iterative degradations of the configurations of the applications 106 until the configuration is accepted by the fit algorithm 500B. According to some embodiments, the degradation function, discussed above with reference to FIG. 1, relates to response time of the applications 106. According to some embodiments, the application performance does not decrease if additional resource capacity is provided for application component replicas. As such, the search algorithm 500A begins with the initial resource, e.g., machine CPU capacities, set equal to 1.0, corresponding to the entire CPU, regardless of actual CPU availability.

In the algorithms 500A, 500B, the distribution level is denoted as c.dla for the applications 106, denoted in the algorithms 500A, 500B as a. In the first configuration c, as explained above with reference to FIG. 3, the search algorithm 500A selects the lowest resource level available that satisfies the reliability requirements of the applications 106, denoted in the algorithms 500A, 500B as MTBFa. The algorithms 500A, 500B begin with the lowest resource level because in some embodiments, a low resource level with lower network latency provides superior performance relative to a high resource level with a high network latency if CPU capacity constraints are not considered and/or are not a factor. In the search algorithm 500A, the controller 112 chooses the lowest available resource level.

In some embodiments, the controller 112 is configured to compute the application MTBF when distributed across each possible resource level, denoted in the algorithms 500A, 500B as r. To determine this resource level, the controller 112 sets the value of $r^{max}(n_a)$ equal to r for all of the application component types, denoted in the algorithms 500A, 500B as $N_a$. The controller 112 then selects the lowest resource level for which all MTBF values are higher than the MTBF specified for the applications 106.

The search algorithm 500A analyzes a set of candidate configurations, denoted in the algorithms 500A, 500B as CC. Initially, as explained above with reference to FIG. 3, the set of candidate configurations initially includes only the best possible configuration described above. For each candidate configuration in the candidate set, the fit algorithm 500B is invoked to attempt to bin-pack the various resources 102, using the host CPU capacities as the capacity of each resource 102.

In some embodiments, a layered queuing network solver ("LQNS solver") is invoked for each application 106 to estimate response time and actual CPU utilization ρ(nk) of each resource 102 using the chosen resource CPU capacities and network latencies corresponding to the distribution level of the applications 106. If one or more candidate configurations provide a feasible fit in the algorithm, the feasible configuration with the lowest performance degradation is chosen. If a feasible fit is not identified, the algorithm 500A picks the candidate configuration that maximizes a gradient function, which is defined in some embodiments as $$\nabla \rho = \frac{-\Delta\left(\max_{a \in A, n_k \in N_a^k} \rho(n_k) - \max_{h \in H} \rho(h)\right)}{\Delta D}.$$

The gradient function is defined as the ratio of the change in "shortfall CPU capacity" between the initial and the candidate configurations to the change in overall performance of the applications 106. The shortfall CPU capacity is defined as the difference between the CPU demand ρ(nk) of the largest unallocated application component replica and the maximum CPU capacity ρ(h) available on a server machine of the resources 102. The configuration that results in the greatest decrease in shortfall CPU capacity per unit decrease in performance as compared to the current configuration is the configuration chosen as the current configuration for the next iteration of the search algorithm 500A.

The search algorithm 500A then creates a new candidate configuration set CC by exploring single-change degradations of the chosen configuration by reducing the allowed CPU capacities for the application component replicas of by a step of Δr, or by increasing the distribution level of a single application 106 to the next higher resource level to provide the application 106 access to more capacity. In some embodiments, Δr is set to 5% by default. The search algorithm 500A is repeated with the new set of candidate configurations until the resource CPU capacity allocations and distributions of the applications 106 are sufficient for a feasible configuration to be found. When a feasible configuration is identified, the controller 112 calculates the difference between the original configuration and the new configuration for each application component replica and returns the configuration data 118, i.e., a set of actions needed to effect the change.

The fit algorithm 500B uses a hierarchical bin packing approach to perform two tasks. First, it determines whether the resource CPU capacities and the application distribution levels assigned by the search algorithm 500A can be feasibly matched. In other words, the fit algorithm 500B determines if the application distribution levels determined by the search algorithm 500A can be packed into the available resources 102. Additionally, the fit algorithm 500B determines actual component placement by assigning physical server machines to each application component replica. The fit algorithm 500B initially considers each application of the applications 106 as a single application bundle with volume equal to the sum of all the CPU capacities of all application replicas. The fit algorithm 500B packs one resource level at a time, starting with the whole system level at the top of the resource hierarchy, where the application bundles are allocated between different data centers. Subsequently, the fit algorithm 500B packs lower levels, e.g., application bundles assigned to a data center are packed across server clusters of the data center, followed by allocation across different racks in the cluster, and server machines in the racks.

For applications 106 for which the distribution level is equal to that of the current resource level being packed, the fit algorithm 500B breaks the application bundle into application replica bundles, each of which has a volume equal to the CPU capacity of the application bundle, denoted in the algorithm 500B as CPU cap $c.cap(nk_a)$. The application replica bundles are packed as independent units during the packing of lower resource levels. Packing within a single resource level is done using a constrained variant of the n log n time first-fit decreasing algorithm, in which bundles are considered in decreasing order of their CPU capacities, and are assigned to the first child resource group that has sufficient CPU capacity to accommodate the application bundles and on which no other application bundle replica exists. As explained above with reference to FIG. 3, if no such resource group is identified, e.g., because the number of available child resource groups is smaller than the number of application bundle replicas, the constraint is relaxed for that application bundle replica, and the application bundle replica is placed in the first resource group that can accommodate the application bundle replica, regardless of whether there is another replica of the same application bundle on that resource group. It should be understood that the illustrated embodiments of the algorithms 500A, 500B are exemplary, and should not be construed as being limiting in any way.

While the description above describes how to allocate application components so that their reliability and performance requirements are met given resources with their reliability and performance characteristics, the approach can be extended to address the availability requirements of the application as follows. Given a mean time to repair (MTTR) for each application tier or component, e.g., starting a new copy of the application component from a checkpoint stored on a disk, the expected application availability can be calculated. According to various embodiments, the availability is defined as being equal to MTBF/(MTBF+MTTR) for any component placement in the set of resources with reliability characterized in terms of the resource, or resource tier MTBF's. The application availability requirement can be used to determine the lowest resource level that satisfies this requirement and the placement algorithm that optimizes performance can be executed as described above.

Figure 6:
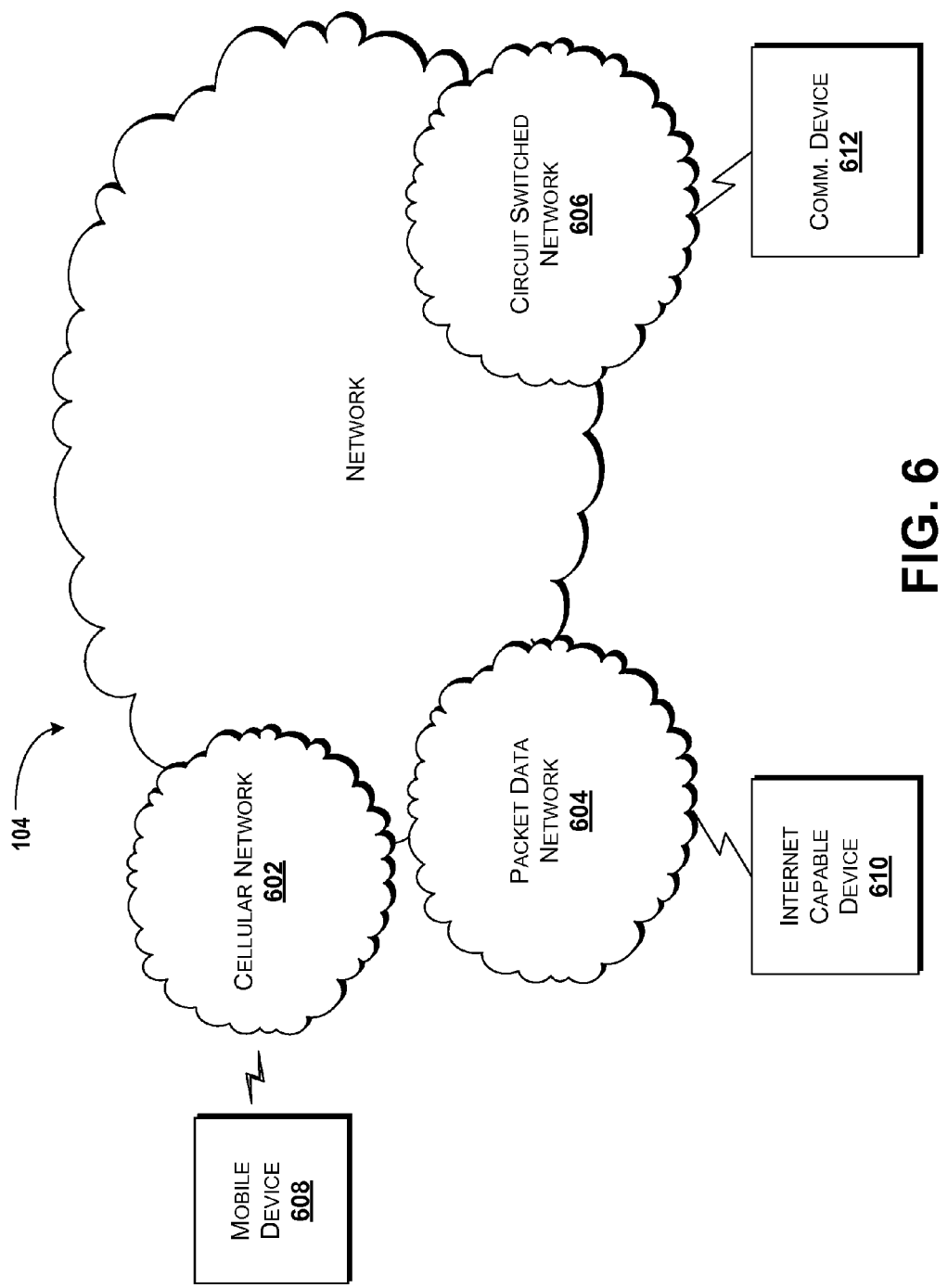
FIG. 6 schematically illustrates a network, according to an exemplary embodiment.

Turning now to FIG. 6, additional details of the network 104 are illustrated, according to an exemplary embodiment. The network 104 includes a cellular network 602, a packet data network 604, for example, the Internet, and a circuit switched network 606, for example, a publicly switched telephone network ("PSTN"). The cellular network 602 includes various components such as, but not limited to, base transceiver stations ("BTS's"), Node-B's or e-Node-B's, base station controllers ("BSC's"), radio network controllers ("RNC's"), mobile switching centers ("MSC's"), mobile management entities ("MME's"), short message service centers ("SMSC's"), multimedia messaging service centers ("MMSC's"), home location registers ("HLR's"), home subscriber servers ("HSS's"), visitor location registers ("VLR's"), charging platforms, billing platforms, voicemail platforms, GPRS core network components, location service nodes, an IMS, and the like. The cellular network 602 also includes radios and nodes for receiving and transmitting voice, data, and combinations thereof to and from radio transceivers, networks, the packet data network 604, and the circuit switched network 606.

A mobile communications device 608, such as, for example, a cellular telephone, a user equipment, a mobile terminal, a PDA, a laptop computer, a handheld computer, and combinations thereof, can be operatively connected to the cellular network 602. Although not illustrated in FIG. 6, the controller 112 can communicate with the cellular network 602. The cellular network 602 can be configured as a 2G GSM network and can provide data communications via GPRS and/or EDGE. Additionally, or alternatively, the cellular network 602 can be configured as a 4G UMTS network and can provide data communications via the HSPA protocol family, for example, HSDPA, EUL (also referred to as HSUPA), and HSPA+. The cellular network 602 also is compatible with 4G mobile communications standards as well as evolved and future mobile standards.

The packet data network 604 includes various devices, for example, servers, computers, databases, and other devices in communication with another, as is generally known. The packet data network 604 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. According to various embodiments, the resources 102 include one or more data centers, server clusters, racks, and/or server machines operating on or in communication with the packet data network 604. In some embodiments, the packet data network 604 includes or is in communication with the Internet. The circuit switched network 606 includes various hardware and software for providing circuit switched communications. The circuit switched network 606 may include, or may be, what is often referred to as a plain old telephone system (POTS). The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 610, for example, a PC, a laptop, a portable device, the controller 112, or any other suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610. In the specification, the network 104 is used to refer broadly to any combination of the networks 602, 604, 606. It should be appreciated that substantially all of the functionality described with reference to the network 104 can be performed by the cellular network 602, the packet data network 604, and/or the circuit switched network 606, alone or in combination with other networks, network elements, and the like.

FIG. 7 illustrates an exemplary computer architecture 700 for the controller 112 or other device capable of executing the software components described herein for dynamically allocating multitier applications based upon performance and reliability of resources. Thus, the computer architecture 700 illustrated in FIG. 7 illustrates an architecture for the controller 112 or another device, which can be embodied in one or more server computers, mobile phones, routers, PDA's, smartphones, desktop computers, netbook computers, tablet computers, and/or laptop computers. The computer architecture 700 may be utilized to execute any aspects of the software components presented herein.

The computer architecture 700 illustrated in FIG. 7 includes a central processing unit 702 ("CPU"), a system memory 704, including a random access memory 706 ("RAM") and a read-only memory ("ROM") 708, and a system bus 710 that couples the memory 704 to the CPU 702. A basic input/output system containing the basic routines that help to transfer information between elements within the computer architecture 700, such as during startup, is stored in the ROM 708. The computer architecture 700 further includes a mass storage device 712 for storing the operating system 114 and the allocation application 116. Although not illustrated, the mass storage device 712 also can be configured to store the operational data 108, the configuration data 118, and/or other data and/or instructions.

The mass storage device 712 is connected to the CPU 702 through a mass storage controller (not shown) connected to the bus 710. The mass storage device 712 and its associated computer-readable media provide non-volatile storage for the computer architecture 700. Although the description of computer-readable media contained herein refers to a mass storage device, such as a hard disk or CD-ROM drive, it should be appreciated by those skilled in the art that computer-readable media can be any available computer storage media that can be accessed by the computer architecture 700.

By way of example, and not limitation, computer-readable storage media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 700. For purposes of this specification and the claims, the phrase "computer-readable storage medium" and variations thereof, does not include waves, signals, and/or other transitory and/or intangible communication media.

According to various embodiments, the computer architecture 700 may operate in a networked environment using logical connections to remote computers through a network such as the network 104. The computer architecture 700 may connect to the network 104 through a network interface 714 connected to the bus 710. As explained above in detail, the network interface 714 also may be utilized to connect to other types of networks and remote computer systems, for example, the resources 102. The computer architecture 700 also may include an input/output controller 716 for receiving and processing input from a number of other devices, including a keyboard, mouse, touchscreen, or electronic stylus (not shown in FIG. 7). Similarly, the input/output controller 716 may provide output to a display screen, a printer, or other type of output device (also not shown in FIG. 7).

It should be appreciated that the software components described herein may, when loaded into the CPU 702 and executed, transform the CPU 702 and the overall computer architecture 700 from a general-purpose computing system into a special-purpose computing system customized to facilitate the functionality presented herein. The CPU 702 may be constructed from any number of transistors or other discrete circuit elements, which may individually or collectively assume any number of states. More specifically, the CPU 702 may operate as a finite-state machine, in response to executable instructions contained within the software modules disclosed herein. These computer-executable instructions may transform the CPU 702 by specifying how the CPU 702 transitions between states, thereby transforming the transistors or other discrete hardware elements constituting the CPU 702.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 700 in order to store and execute the software components presented herein. It also should be appreciated that the computer architecture 700 may include other types of computing devices, including hand-held computers, embedded computer systems, personal digital assistants, and other types of computing devices known to those skilled in the art. It is also contemplated that the computer architecture 700 may not include all of the components shown in FIG. 7, may include other components that are not explicitly shown in FIG. 7, or may utilize an architecture completely different than that shown in FIG. 7.

Based on the foregoing, it should be appreciated that systems and methods for dynamically allocating multitier applications based upon performance and reliability of resources have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

We claim:

1. A method comprising:
   detecting, at a processor executing an allocation application, a failure associated with resources associated with a multitier application;
   obtaining, by the processor, operational data associated with the resources and the multitier application; and
   determining, by the processor, an allocation scheme for the multitier application, the allocation scheme comprising data indicating allocation of the multitier application across the resources, wherein determining the allocation scheme comprises identifying a resource level associated with the resources that satisfies an application reliability requirement of the multitier application, determining if the components of the multitier application can be allocated within the resource level, and if the components can be allocated within the resource level, outputting configuration data corresponding to the allocation scheme, the configuration data comprising computer executable instructions for allocating the multitier application across the resources according to the allocation scheme.

2. The method of claim 1, wherein the failure comprises an impending failure.

3. The method of claim 1, wherein the operational data comprises multitier application data relating to the multitier application and resource data relating to the resources.

4. The method of claim 3, wherein the resource data comprises performance information associated with the resources and reliability information associated with the resources.

5. The method of claim 4, wherein the application data indicates an availability requirement of the multitier application and a performance requirement of the multitier application.

6. The method of claim 4, wherein:
   the application data indicates a reliability requirement of the multitier application and a performance requirement of the multitier application;
   the reliability information comprises a mean time between failures associated with the resources;
   the reliability requirement comprises a mean time between failures requirement associated with the multitier application; and
   the availability requirement comprises a probability that the application is operational and accessible to serve application service requests.

7. The method of claim 3, wherein
   the resource data comprises capacity information, communication latency information, and reliability information; and
   the reliability information comprises a mean time between failures associated with the resources.

8. The method of claim 1, further comprising:
   if the application cannot be allocated within the resource level, identifying a reconfiguration action for allocating the application components;
   determining if a reconfigured application can be allocated within the resource level;
   if the reconfigured application can be allocated, outputting the configuration information; and
   if the reconfigured application cannot be allocated, identifying alternative reconfiguration actions and determining if the application can be allocated until the allocation succeeds and the configuration information is outputted, wherein the reconfiguration action comprises one of reducing a resource allocation of an application component, reducing the resource allocation of an application tier, reducing the number of replicas for one or more application components associated with the application, and moving the application tier to a higher resource level, and wherein the reconfiguration action is chosen such that the reconfiguration action minimizes an overall performance degradation and maximizes an amount of additional resource capacity made available.

9. The method of claim 1, wherein the resource level corresponds to a lowest resource tier of a plurality of resource tiers of the resources, the plurality of resource tiers comprising a data center tier, a server cluster tier, a rack tier, and a server tier.

10. The method of claim 8, wherein:
    identifying the reconfiguration action comprises executing a greedy search algorithm to identify an optimal reconfiguration action; and
    determining if the application can be allocated at a resource level by executing a fit algorithm to analyze a configuration identified via execution of the greedy search algorithm.

11. The method of claim 10, wherein the fit algorithm comprises a hierarchical bin-packing algorithm configured to begin packing a top resource level of a resource hierarchy and to proceed with packing remaining resource levels until application components are allocated to individual resources of physical machines, wherein:
    applications targeted to a resource level below a level being packed by the algorithm are considered to be one application bundle with resource demand equivalent to the sum of the application component resource levels;
    application bundles are divided into individual application components when the algorithm reaches a level to which the application bundles are assigned;
    a fit algorithm returns an error if the applications cannot be allocated; and
    if the applications can be allocated, the fit algorithm returns the placement of application components in the resources.

12. A computer-readable storage medium having computer executable instructions stored thereupon that, when executed by a processor, cause the processor to perform operations comprising:
    detecting a failure of resources in communication with the processor, the resources hosting a multitier application;
    obtaining, in response to detecting the failure, operational data associated with the resources and the multitier application, the operational data comprising application data relating to the multitier application and resource data relating to the resources; and determining an allocation scheme for the multitier application, the allocation scheme comprising data indicating allocation of the multitier application across the resources, wherein determining the allocation scheme comprises identifying a resource level associated with the resources, the resource level satisfying an application reliability requirement of the multitier application, determining if the components of the multitier application can be allocated within the resource level, and if the components can be allocated within the resource level, outputting configuration data corresponding to the allocation scheme, the configuration data comprising computer executable instructions for allocating the multitier application across the resources according to the allocation scheme.

13. The computer-readable storage medium of claim 12, wherein:

the application data indicates an availability requirement of the multitier application and a performance requirement of the multitier application, the application data indicates a reliability requirement of the multitier application and a performance requirement of the multitier application, the reliability information comprises a mean time between failures associated with the resources, the reliability requirement comprises a mean time between failures requirement associated with the multitier application, and the availability requirement comprises a probability that the application is operational and accessible to serve application service requests.

14. The computer-readable storage medium of claim 12, wherein detecting the failure comprises:

detecting a new multitier application that is not supported by a current configuration of the resources; and receiving an alarm generated by a monitoring device operating in communication with the resources.

15. The computer-readable storage medium of claim 12, wherein:

the resource data comprises performance information associated with the resources and reliability information associated with the resources; and the application data indicates a reliability requirement of the multitier application and a performance requirement of the multitier application, wherein
the reliability information comprises a mean time between failures associated with the resources, and wherein
the reliability requirement comprises a mean time between failures requirement associated with the multitier application.

16. The computer-readable storage medium of claim 12, wherein:

the resource data comprises performance information associated with the resources and reliability information associated with the resources; and the application data indicates an availability requirement of the multitier application and a performance requirement of the multitier application, wherein
the reliability information comprises a mean time between failures associated with the resources, and wherein
the availability requirement comprises a probability that the application is able to serve application requests at any given time.

17. The computer-readable storage medium of claim 12, further comprising computer executable instructions that, when executed by the processor, cause the processor to perform operations comprising: if the application cannot be allocated within the resource level, identifying a reconfiguration action for allocating application components, the reconfiguration action comprising moving the application to a further resource level associated with the resources;

determining if the application can be allocated within the further resource level; and if the application can be allocated within the further resource level, outputting configuration information corresponding to the further resource level.

18. A method comprising:

detecting, at a processor executing an allocation application, a failure associated with the resources, the resources being associated with a multitier application and comprising a plurality of resource tiers;

obtaining, by the processor, operational data associated with the resources and the multitier application, the operational data comprising application data relating to the multitier application and resource data relating to the resources; and determining, by the processor, an allocation scheme for the multitier application, the allocation scheme comprising data indicating allocation of the multitier application across the resources to adjust for the failure detected, wherein determining the allocation scheme comprises identifying a resource level associated with the resources, the resource level satisfying an application reliability requirement of the multitier application, determining if the components of the multitier application can be allocated within the resource level, and if the components can be allocated within the resource level, outputting configuration data corresponding to the allocation scheme, the configuration data comprising computer executable instructions for allocating the multitier application across the resources according to the allocation scheme.

19. The method of claim 18, wherein:

the resource data comprises performance information associated with the resources and reliability information associated with the resources; and the application data indicates a reliability requirement of the multitier application and a performance requirement of the multitier application, wherein
the reliability information comprises a mean time between failures associated with the resources, and wherein
the reliability requirement comprises a mean time between failures requirement associated with the multitier application.

20. The method of claim 18, wherein:

the application data indicates a reliability requirement of the multitier application and a performance requirement of the multitier application;

the reliability information comprises a mean time between failures associated with the resources;

the reliability requirement comprises a mean time between failures requirement associated with the multitier application; and the availability requirement comprises a probability that the application is operational and accessible to serve application service requests.

* * * * *